US012500476B2

(12) United States Patent
Yoshida et al.

(10) Patent No.: US 12,500,476 B2
(45) Date of Patent: Dec. 16, 2025

(54) MOTOR HAVING A CASE FOR ACCOMMODATING A STATOR

(71) Applicant: MITSUBA Corporation, Gunma (JP)

(72) Inventors: Yasushi Yoshida, Gunma (JP); Yutaro Jo, Gunma (JP)

(73) Assignee: MITSUBA Corporation, Gunma (JP)

( * ) Notice: Subject to any disclaimer, the term of this patent is extended or adjusted under 35 U.S.C. 154(b) by 232 days.

(21) Appl. No.: 18/449,656

(22) Filed: Aug. 14, 2023

(65) Prior Publication Data
US 2024/0088746 A1 Mar. 14, 2024

(30) Foreign Application Priority Data

Sep. 8, 2022 (JP) .................... 2022-142920

(51) Int. Cl.
H02K 5/24 (2006.01)
H02K 7/08 (2006.01)
H02K 7/116 (2006.01)
H02K 21/16 (2006.01)
B60J 7/057 (2006.01)
E05F 15/643 (2015.01)

(52) U.S. Cl.
CPC ............... *H02K 5/24* (2013.01); *H02K 7/085* (2013.01); *H02K 7/1166* (2013.01); *H02K 21/16* (2013.01); *B60J 7/0573* (2013.01); *E05F 15/643* (2015.01); *E05Y 2900/542* (2013.01)

(58) Field of Classification Search
CPC . B60J 7/0573; E05F 15/643; E05Y 2900/542; H02K 7/085; H02K 7/1166; H02K 21/16

USPC ........................................... 310/51
See application file for complete search history.

(56) References Cited

U.S. PATENT DOCUMENTS

| | | | | |
|---|---|---|---|---|
| 2011/0304225 A1* | 12/2011 | Terashita | ............... | H02K 1/185 310/49.37 |
| 2012/0043840 A1* | 2/2012 | Annaka | .................. | H02K 7/081 310/83 |
| 2018/0198333 A1* | 7/2018 | Ohori | ...................... | H02K 1/278 |
| 2018/0208081 A1* | 7/2018 | Iwatate | ............. | B60N 2/02246 |
| 2023/0104723 A1* | 4/2023 | Ohori | ........................ | B21F 3/00 310/156.55 |
| 2023/0208260 A1* | 6/2023 | Yoshida | ................. | H02K 15/02 29/596 |
| 2023/0318400 A1* | 10/2023 | Ogata | .................... | H02K 7/081 310/91 |
| 2023/0358285 A1* | 11/2023 | Oh | ........................ | F16D 55/226 |

FOREIGN PATENT DOCUMENTS

JP 2017127146 7/2017

* cited by examiner

*Primary Examiner* — Rashad H Johnson
(74) *Attorney, Agent, or Firm* — JCIPRNET

(57) ABSTRACT

A case 31 has a total of first to sixth flat parts 32A to 32F arranged in a circumferential direction of the case 31 and a total of first to sixth arced parts 32a to 32f connecting adjacent flat parts with each other. When viewed in an axial direction of a shaft 44, inner circumferential surfaces CF of the first to sixth arced parts 32a to 32f are each formed in an arced shape having a radius R1 and a center AC of the case 31 as the center. In addition, since the stator 35 is only supported by the inner circumferential surfaces CF (six in total), the press-fit load of the stator 35 with respect to the case 31 can be reduced, and it is possible to increase the assembling accuracy.

3 Claims, 12 Drawing Sheets

MOTOR HAVING A CASE FOR ACCOMMODATING A STATOR

CROSS-REFERENCE TO RELATED APPLICATION

This application claims the priority benefit of Japan application serial No. 2022-142920, filed on Sep. 8, 2022. The entirety of the above-mentioned patent application is hereby incorporated by reference herein and made a part of this specification.

BACKGROUND

Technical Field

The invention relates to an inner-rotor type brushless motor.

Description of Related Art

Conventionally, vehicle-mounted brushless motors mounted in vehicles such as automobiles are used for sunroof devices and power window devices, for example. These brushless motors are disposed in narrow spaces inside ceilings, doors, etc., of vehicles. Therefore, it is desired to reduce the thickness of the brushless motors. Such brushless motor is described in Patent Document 1, for example.

The brushless motor disclosed in Patent Document 1 is an inner-rotor type brushless motor, and includes a motor case formed in a hexagonal shape when viewed in the axial direction of the rotation shaft. In addition, a stator core formed in a hexagonal shape when viewed in the axial direction of the rotation shaft like the motor case is accommodated inside the motor case. Accordingly, the entire brushless motor is arranged to fit within the width of two surface facing each other with the center of the motor case as the center.

PRIOR ART DOCUMENT(S)

Patent Document(s)

[Patent Document 1] Japanese Laid-open No. 2017-127146

In the brushless motor disclosed in Patent Document 1, a configuration in which the stator core (stator) in a hexagonal shape is gaplessly accommodated in the motor case (case) in a hexagonal shape is adopted. Therefore, when the stator core is press-fit with the case, the press-fit load may be increased. Thus, in order to reduce the press-fit load, it is considered to provide a small gap therebetween and fill the gap with an epoxy resin-based adhesive, etc. However, in such case, the centers of the stator core and the motor case may be displaced from each other, the assembling accuracy of the brushless motor may decrease, and the rotational resistance of the brushless motor may vary from one product to another.

SUMMARY

An aspect of the invention provides a brushless motor. The brushless motor includes: a stator, having a hollow part; a case, accommodating the stator; and a shaft, rotatably accommodated in the hollow part, and rotatably supported by the case. The case has multiple flat parts arranged in a circumferential direction of the case and a plurality of connection parts connecting adjacent flat parts of the flat parts with each other. When viewed in an axial direction of the shaft, inner circumferential surfaces of the connection parts are formed to be arc-shaped, with a center of the case as a center. The stator is supported only by the inner circumferential surfaces.

DESCRIPTION OF THE EMBODIMENTS

The invention provides a brushless motor capable of reducing the press-fit load of the stator with respect to the case and increasing the assembling accuracy.

According to the invention, the case has multiple flat parts arranged in the circumferential direction of the case and multiple connection parts connecting adjacent flat parts with each other. When viewed in an axial direction of the shaft, inner circumferential surfaces of the connection parts are formed to be arc-shaped, with a center of the case as a center. Since the stator is only supported by the inner circumferential surfaces, the press-fit load can be reduced, and it is possible to increase the assembling accuracy.

Embodiment 1

In the following, Embodiment 1 of the invention is described in detail with reference to the drawings.

Figure 1:
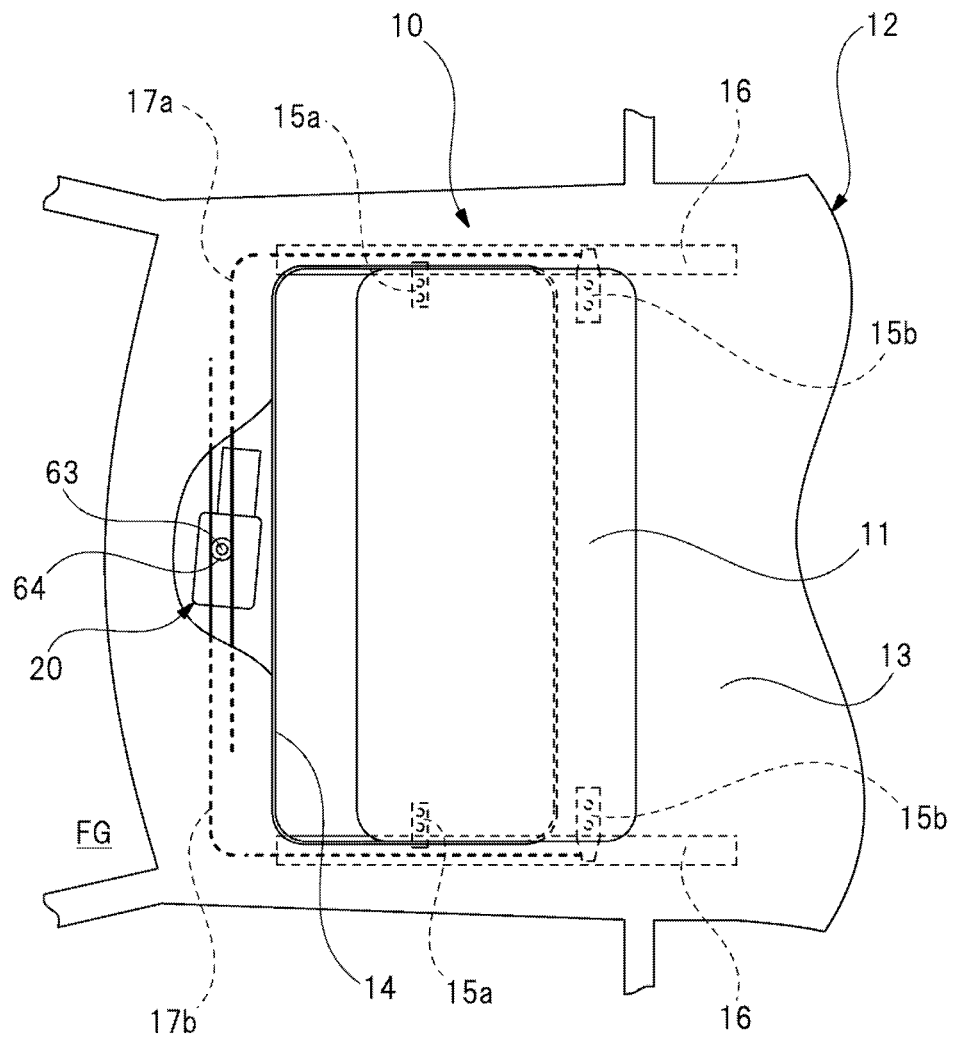
FIG. 1 is a schematic view illustrating a sunroof device disposed in a roof of a vehicle.
Figure 2:
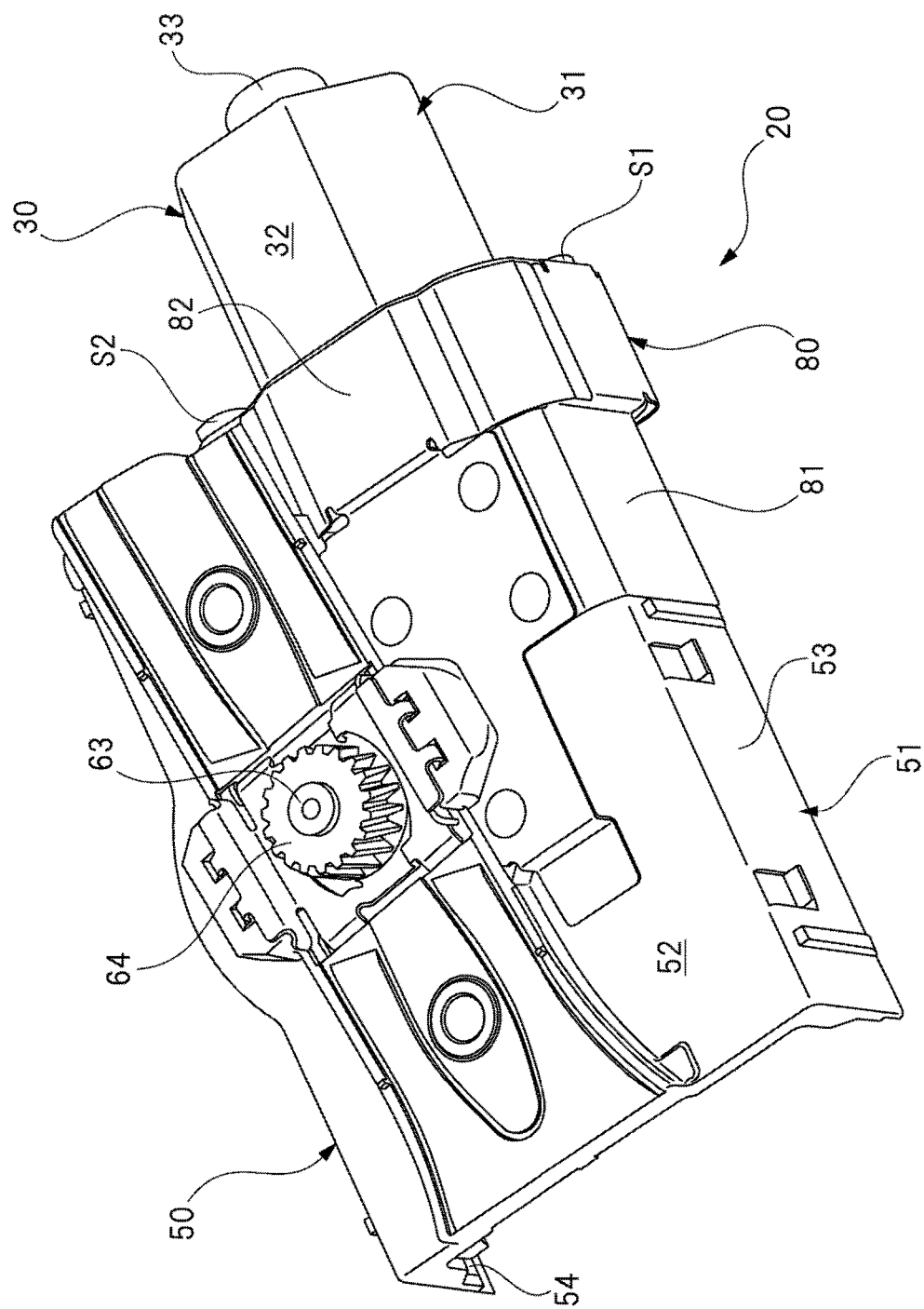
FIG. 2 is a perspective view illustrating an output gear side of a sunroof motor.
Figure 3:
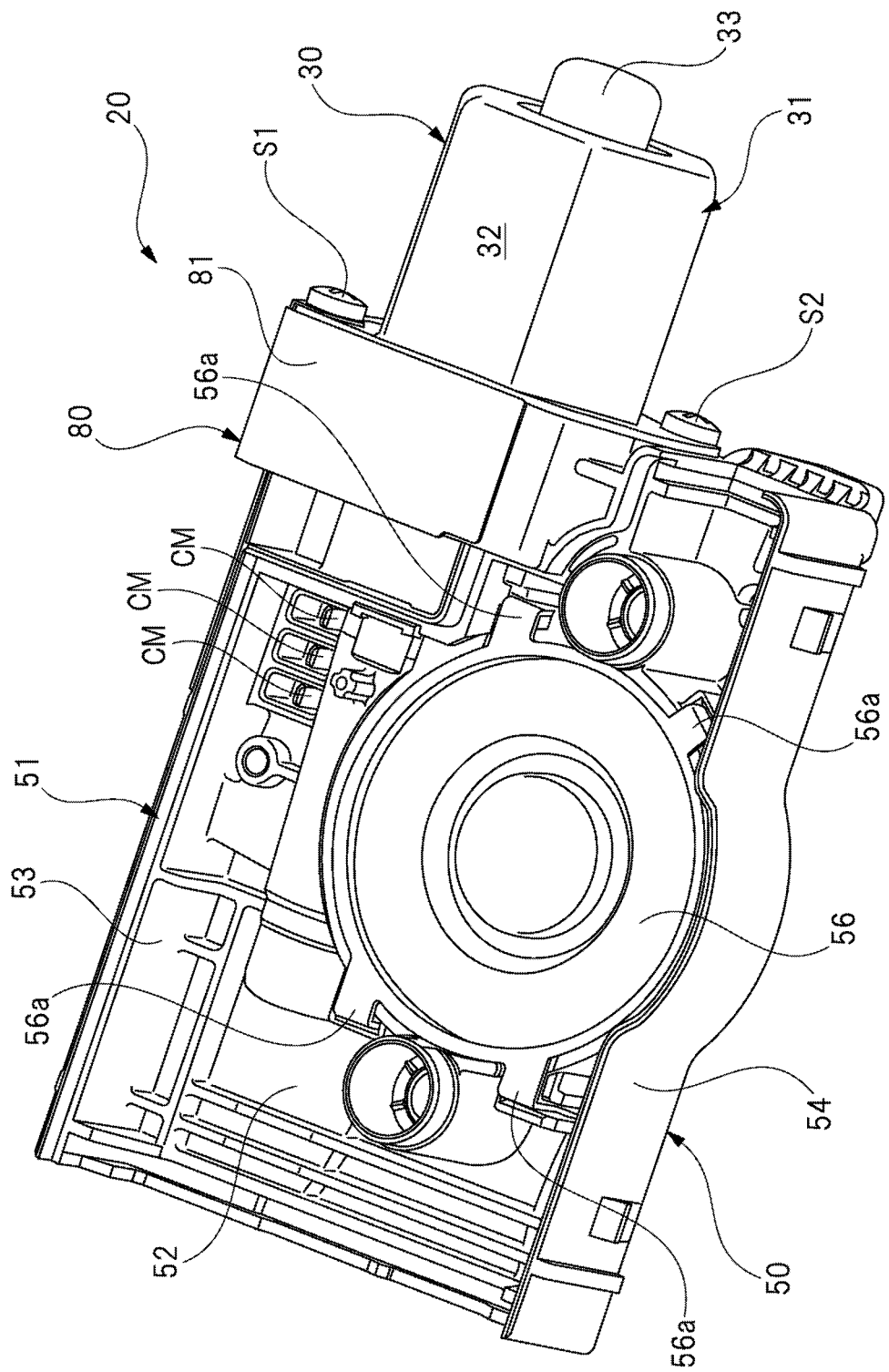
FIG. 3 is a perspective view illustrating a cover member side of the sunroof motor.
Figure 4:
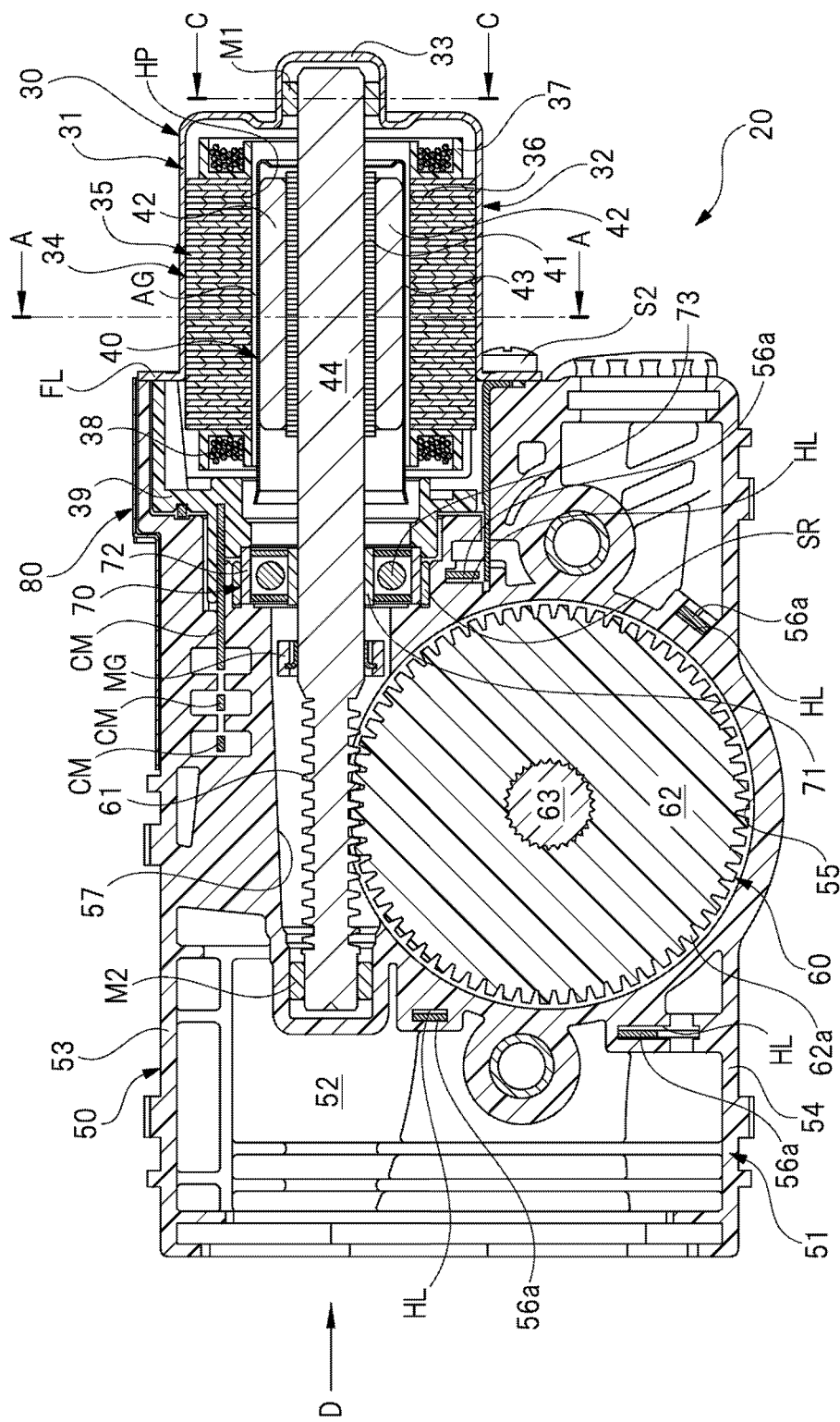
FIG. 4 is a cross-sectional view illustrating the sunroof motor along an axial direction of a shaft.
Figure 5:
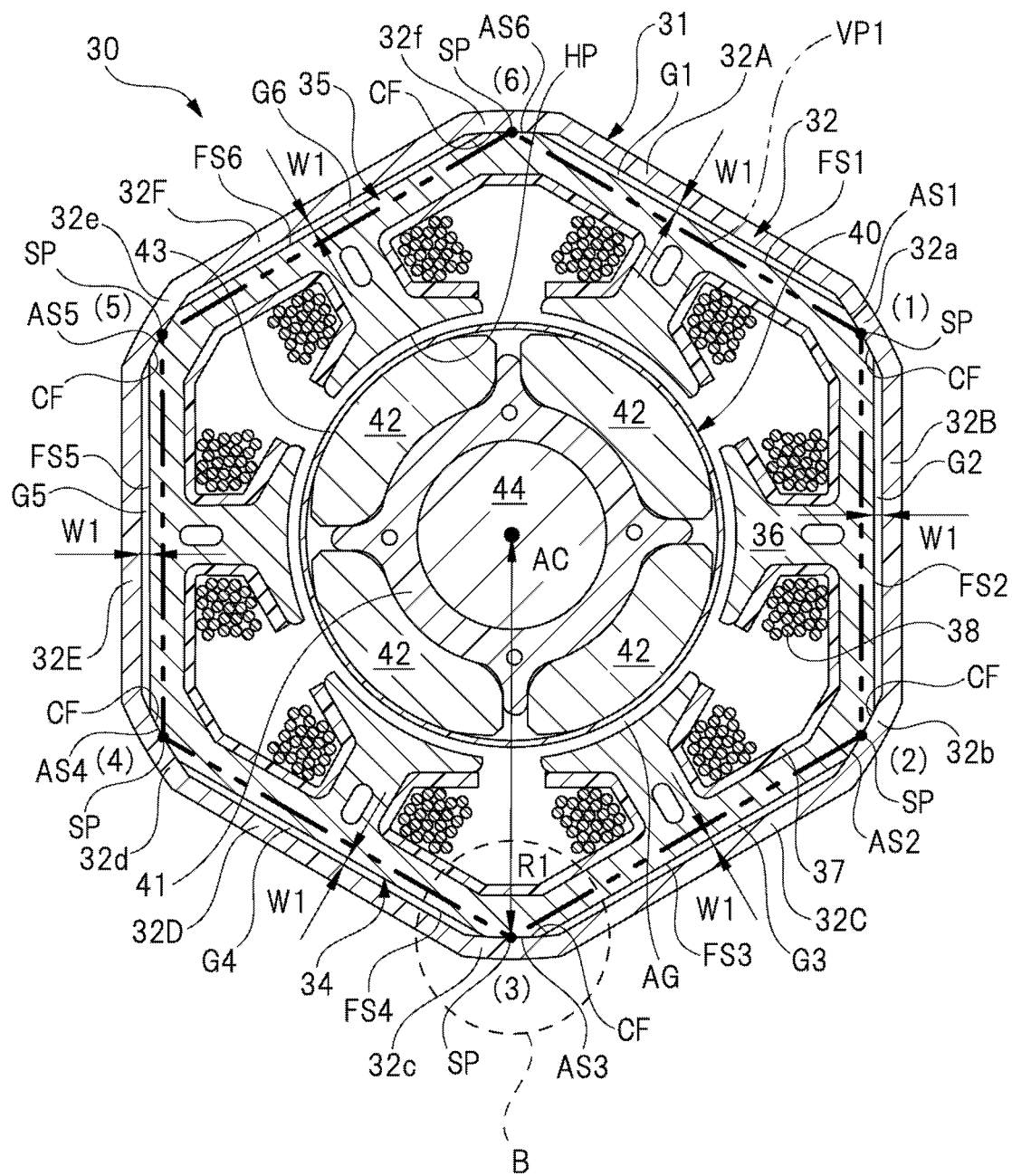
FIG. 5 is a cross-sectional view taken along a line A-A of FIG. 4.
Figure 6:
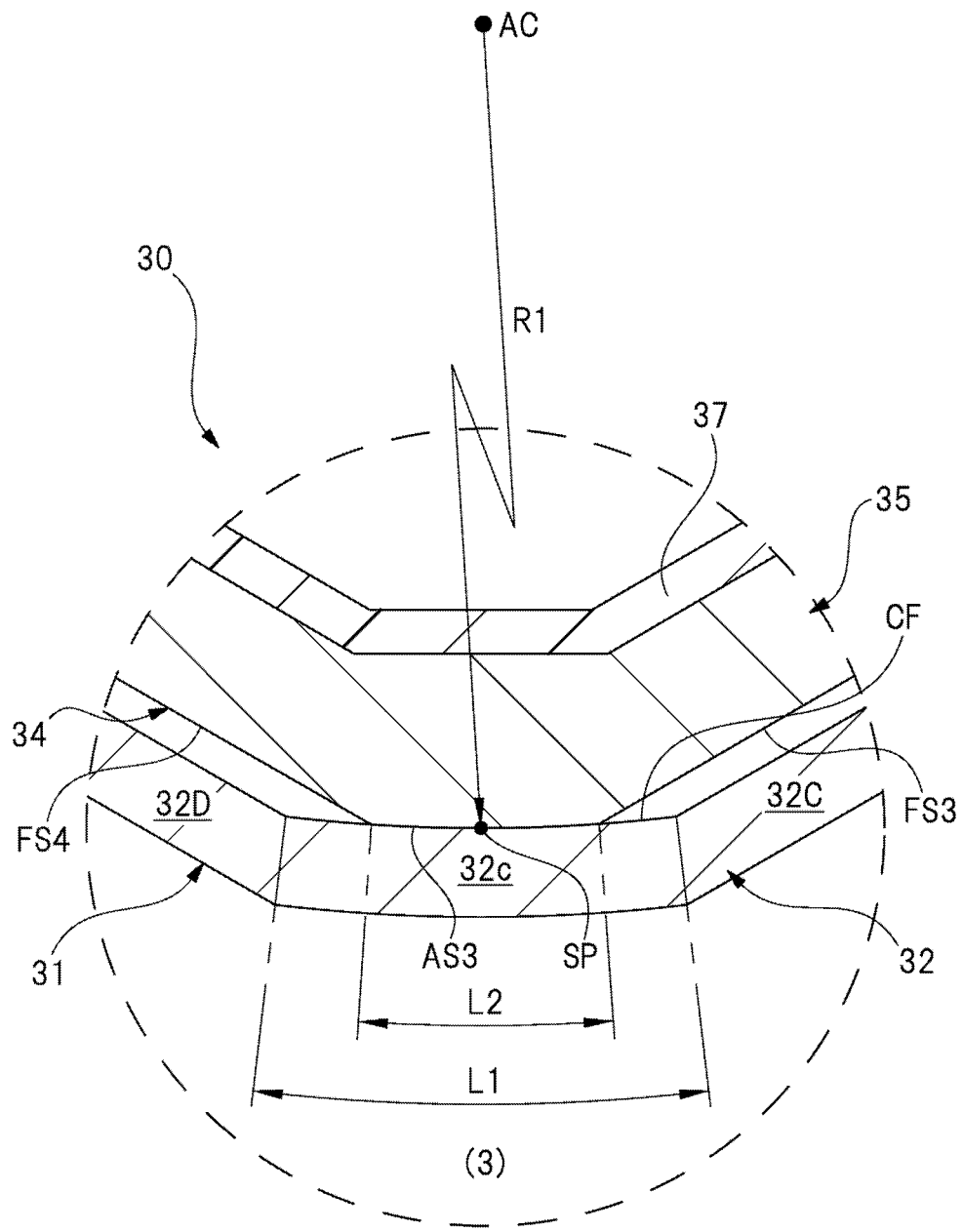
FIG. 6 is an enlarged view of a part B of a dashed circle in FIG. 5.
Figure 7:
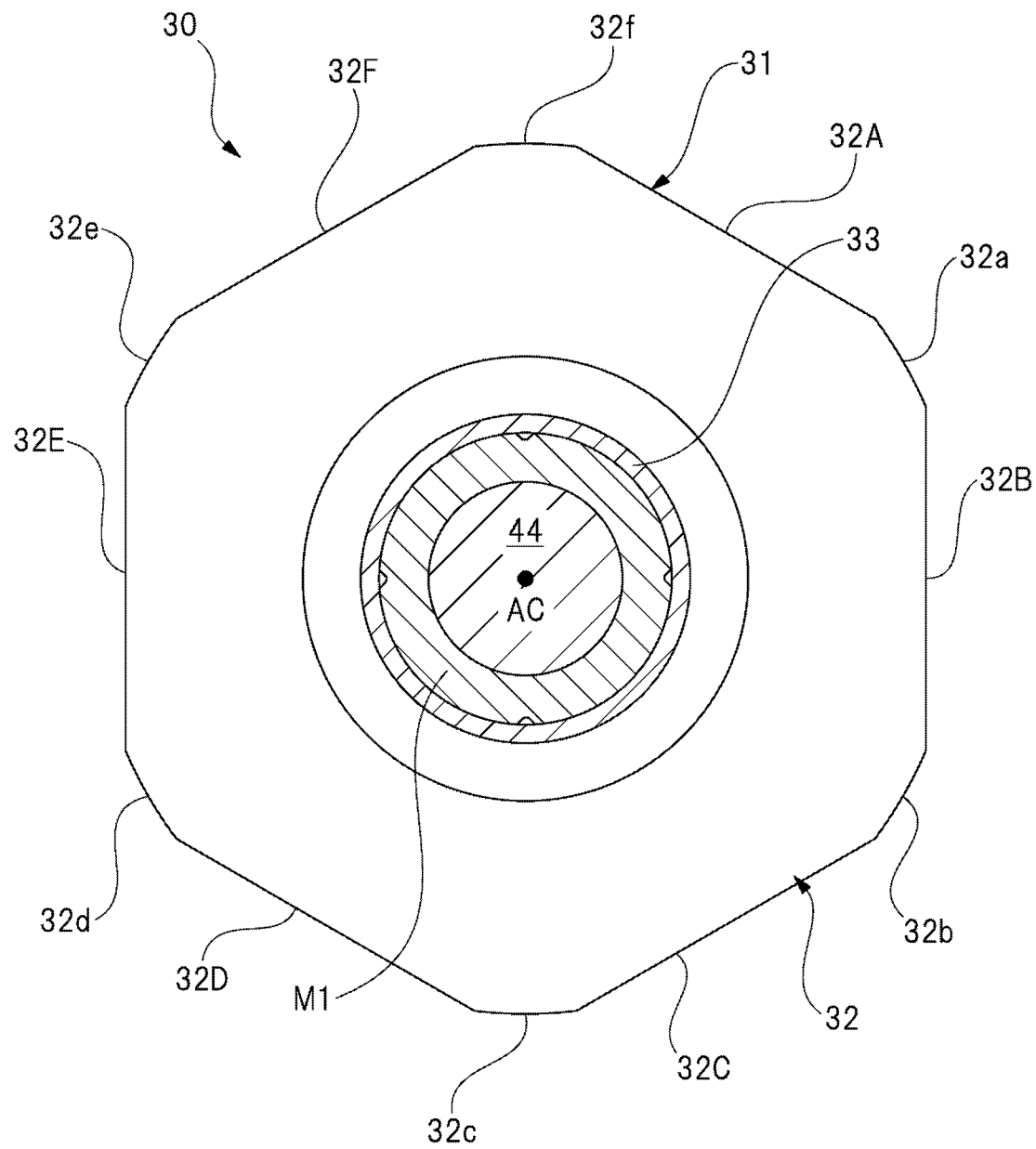
FIG. 7 is a cross-sectional view taken along a line C-C of FIG. 4.
Figure 8:
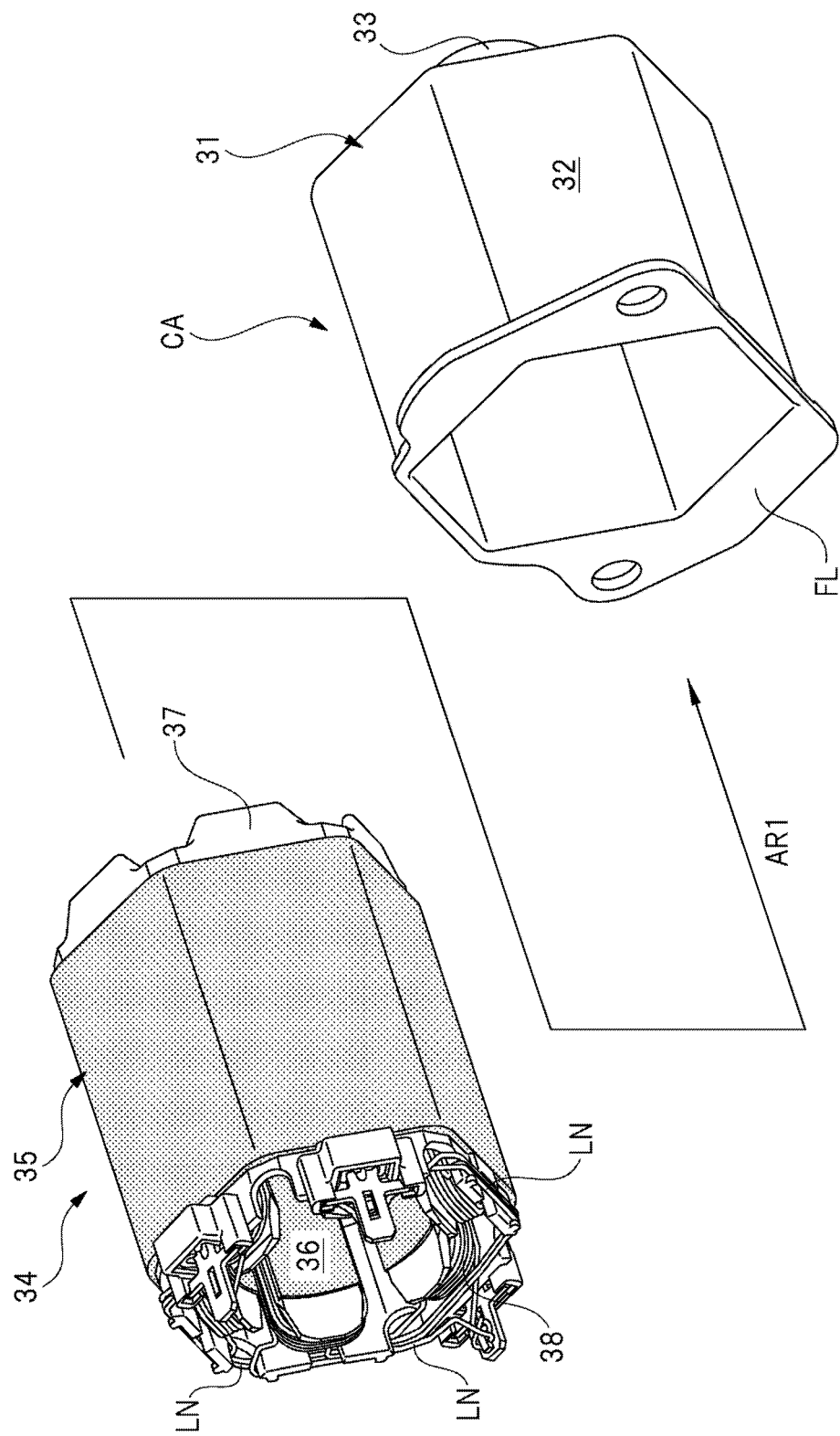
FIG. 8 is an exploded perspective view illustrating an assembling procedure of a stator to a case.

FIG. 1 is a schematic view illustrating a sunroof device disposed in a roof of a vehicle. FIG. 2 is a perspective view illustrating an output gear side of a sunroof motor. FIG. 3 is a perspective view illustrating a cover member side of the sunroof motor. FIG. 4 is a cross-sectional view illustrating the sunroof motor along an axial direction of a shaft. FIG. 5 is a cross-sectional view taken along a line A-A of FIG. 4. FIG. 6 is an enlarged view of a part B of a dashed circle in FIG. 5. FIG. 7 is a cross-sectional view taken along a line C-C of FIG. 4. FIG. 8 is an exploded perspective view illustrating an assembling procedure of a stator to a case.

Figure 9:
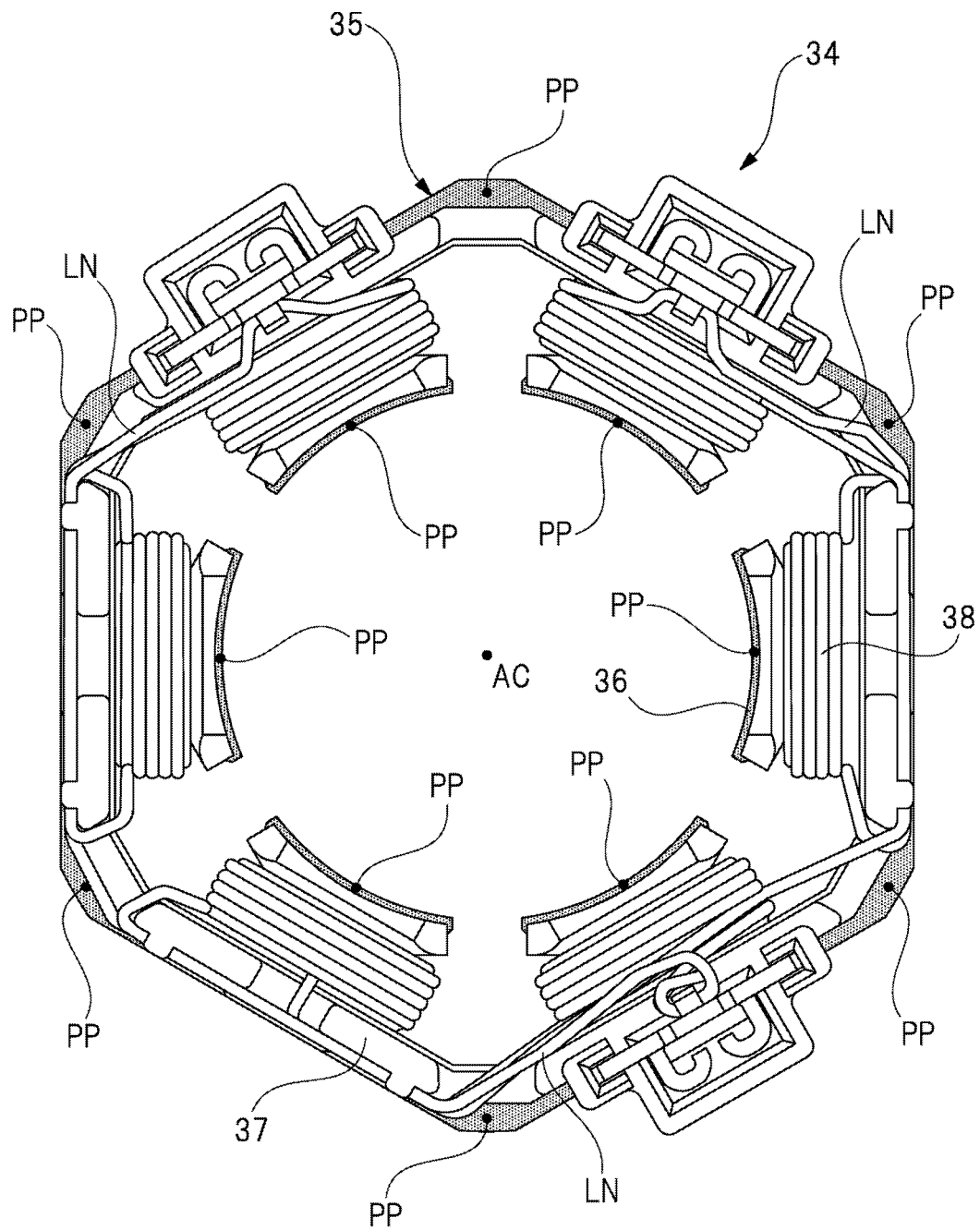
FIG. 9 is a view illustrating a single stator when viewed from a direction of an arrow sign D of FIG. 4.

FIG. 9 is a view illustrating a single stator when viewed from a direction of an arrow sign D of FIG. 4.

[Outline of Sunroof Device]

As shown in FIG. 1, a sunroof device 10 includes a roof panel 11. The roof panel 11 opens and closes an opening part 14 formed on a roof of a vehicle 12. A pair of shoes 15a, 15b are respectively fixed to the two sides (upper and lower sides in FIG. 1) of the roof panel 11 in a vehicle width direction. In addition, guide rails 16 extending in the front-rear direction (left-right direction of FIG. 1) of the vehicle 12 are respectively fixed to the two sides of the opening part 14 in the vehicle width direction in the roof 13. With the pair of shoes 15a, 15b being respectively guided by the pair of guide rails 16 corresponding thereto, the roof panel 11 moves in the front-rear direction of the vehicle 12.

Each of the shoes 15b disposed on the rear side (right side in FIG. 1) of the vehicle 12 is linked with an end of a driving cable 17a, 17b having a gear. The other ends of the driving cables 17a, 17b are routed to the front side (left side in FIG. 1) of the vehicle 12 with respect to the opening part 14.

A sunroof motor 20 is provided on the front side of the vehicle 12 with respect to the opening part 14 and inside the roof 13 between the opening part 14 and a front glass FG. In addition, the other ends of the pair of driving cables 17a, 17b are engaged with an output gear 64 provided in the sunroof motor 20. When the sunroof motor 20 is driven, the pair of driving cables 17a, 17b move opposite to each other in a longitudinal direction thereof. Accordingly, the sunroof panel 11 is pushed and pulled by the pair of driving cables 17a, 17b via the pair of shoes 15b and opens and closes the opening part 14.

[Outline of Sunroof Motor]

As shown in FIGS. 2 to 4, the sunroof motor 20 includes an electric motor part 30 and a deceleration mechanism part 50. In addition, the electric motor part 30 and the deceleration mechanism part 50 are firmly linked with each other by using a first fastening screw S1 and a second fastening screw S2 and are integrated (unitized).

[Electric Motor Part]

The electric motor part 30 is a motor without brush, i.e., a brushless motor, and equivalent to the brushless motor of the invention. The electric motor 30 has a case 31 formed in a bottomed cylindrical shape by performing a deep drawing process, etc., on a magnetic body such as a steel plate. The case 31 includes a sidewall part 32 forming the outer shell of the electric motor part 30 and formed in a hexagonal shape when viewed in the axial direction of the case 31. In addition, a side of the sidewall part 32 in the axial direction (right side in FIGS. 2 to 4) is blocked by a bottom wall part 33 formed in a cylindrical shape.

[Stator Unit]

As shown in FIGS. 4 and 5, a stator unit 34 is accommodated inside the case 31. The stator unit 34 has a stator 35 formed by laminating a plurality of thin steel plates (magnetic bodies). The stator 35 is fixed to the inner side of the case 31 and includes a total of six teeth 36. Coils 38 of three phases, which are a U-phase, a V-phase, and a W-phase, are wound on the teeth 36 via an insulator (insulation member) 37. In addition, on the radially inner side of the stator 35, that is, the tip end side of the total of six teeth 36, a hollow part HP is formed. A rotor unit 40 is rotatably accommodated in the hollow part HP in a non-contact state with respect to the teeth 36.

[Rotor Unit]

The rotor unit 40 is rotatably provided on the radially inner side of the stator 35 via a predetermined air gap AG. The rotor unit 40 has a rotor core 41 formed in a cylindrical shape. The rotor core 41 is formed by laminating multiple thin steel plates (magnetic bodies). A total of four permanent magnets 42 are fixed to the radially outer side of the rotor core 41 by using an adhesive, etc. Specifically, the respective permanent magnets 42 are disposed at equal intervals (interval of 90°) in the circumferential direction of the rotor core 41.

In addition, the radially outer side of the respective permanent magnets 42 fixed to the rotor core 41 is covered by a magnet holder 43 formed in a substantially cylindrical shape by using a thin stainless steel plate, etc. The magnet holder 43 prevents the permanent magnets 42 from falling off from the rotor core 41. Accordingly, even if the rotor unit 40 rotates at a high speed, the permanent magnets 42 do not fall off from the rotor core 41 due to a centrifugal force at such time.

A shaft 44 is fixed to the radially inner side of the rotor core 41 by press-fitting. Accordingly, the rotor unit 40 rotates around the shaft 44 as the center. To ensure sufficient strength, the shaft 44 is made of a round steel bar (made of metal), and the rotation center of the shaft 44 is aligned with a center AC of the case 31 (see FIG. 5).

In addition, the base end side of the shaft 44 in the axial direction (right side of FIG. 4) is accommodated in the case 31, and is rotatably supported by a first metal M1 (radial bearing) accommodated in the bottom wall part (bearing accommodation part) 33 of the case 31. That is, the shaft 44 is rotatably supported by the case 31 via the first metal M1. The center of the bottom wall part 33 and the center of the first metal M1 are also aligned with the center AC (see FIG. 5) of the case 31. Here, the first metal M1 is equivalent to the bearing of the invention.

Meanwhile, the tip end side of the shaft 44 in the axial direction (left side of FIG. 4) is accommodated in a housing 51 forming the deceleration mechanism part 50, and is rotatably supported by a second metal M2 (radial bearing) mounted to a worm accommodation part 57 of the housing 51.

In addition, a worm 61 forming a deceleration mechanism 60 is integrally provided on the tip end side of the shaft 44 in the axial direction. That is, the worm 61 is also made by a round steel bar to increase the rigidity of the worm 61 and prevent the worm 61 from being curved, thereby ensuring reliable engagement with the worm wheel 62.

Moreover, a ball bearing 70 is provided at an intermediate part of the shaft 44 in the axial direction. That is, the rotor core 41 is arranged side-by-side with the ball bearing 70. The ball bearing 70 rotatably supports the shaft 44 and includes an inner race 71 and an outer race 72. The inner race 71 is formed in a substantially cylindrical shape by using a steel material. The outer race 72 is formed in a substantially cylindrical shape by using a steel material same as the inner race 71 and has a diameter greater than that of the inner race 71. In addition, in the radial direction of the ball bearing 70, multiple steel balls 73 are provided between the inner race 71 and the outer race 72.

In addition, the inner race 71 is fixed through press-fitting with the shaft 44. That is, the inner race 71 rotates with the shaft 44. As shown in FIG. 4, the dimension of the outer diameter of the shaft 44 is greater than the dimension of the outer diameter of the worm 61. Thus, it is possible to press-fit the ball bearing 70 with respect to the axial direction of the shaft 44 from the side of the worm 61.

Here, a sensor magnet MG is provided between the worm 61 and the ball bearing 70 in the axial direction of the shaft 44. The sensor magnet MG is used for controlling the rotation direction and the rotation speed of the shaft 44. That is, the ball bearing 70 is disposed between the sensor magnet MG and the rotor core 41 in the axial direction of the shaft 44.

In addition, as shown in FIG. 4, the electric motor part 30 includes a bearing support member 39. The bearing support part 39 is formed by a resin material, such as plastics, and is mounted to the housing 51 from the side of the electric motor part 30 (right side of FIG. 4). In addition, the bearing support member 39 supports the outer race 72 of the ball bearing 70 from the axial direction thereof. That is, the bearing support member 39 has a function of preventing the ball bearing 70 from rattling in the housing 51. The side of the electric motor part 30 of the bearing support member 39 is supported by the case 31 forming the outer shell of the electric motor part 30.

In addition, a total of three conductive members CM are mounted to the bearing support member 39. The conductive members CM are formed in a rod shape by brass which exhibits excellent conductivity, and, on a side in the longitudinal direction thereof, respectively electrically connected with the three-phase coils 38. Comparatively, an external connector (not shown) provided on the side of the vehicle 12 (see FIG. 1) is electrically connectible with the other side of the conductive members CM in the longitudinal direction. Accordingly, a driving current is supplied from a vehicle-mounted battery, etc., to the three-phase coils 38 of the sunroof motor 20, and the shaft 44 is rotated in a forward direction or a reverse direction.

[Deceleration Mechanism Part]

As shown in FIGS. 2 to 4, the deceleration mechanism part 50 includes a housing 51 accommodating the deceleration mechanism 60. The housing 51 is formed in a substantially flat rectangular parallelepiped shape by a resin material such as plastics, and has a first wall part 52, a second wall part 53, and a third wall part 54. Among the first, second, and third wall parts 52, 53, 54, the first wall part 52 takes up the largest proportion.

As shown in FIG. 4, a worm wheel accommodation part 55 is provided inside the housing 51. The worm wheel accommodation part 55 is disposed near the third wall part 54. In addition, the worm wheel 62 forming the deceleration mechanism 60 is rotatably accommodated inside the worm wheel accommodation part 55. Here, the worm wheel 62 is formed by a resin material such as plastics, and the weight is reduced. In addition, a tooth part 62a is provided on the worm wheel 62. The tooth part 62a is engaged with the worm 61 inside the housing 51.

That is, the deceleration mechanism 60 is a worm decelerator able to achieve a relatively high deceleration ratio. Specifically, in the embodiment, the deceleration ratio of the deceleration mechanism 60 is [1:67]. That is, the deceleration ratio is arranged so that when the worm 61 rotates 67 times, the worm wheel 62 eventually rotates once.

In addition, the base end part of an output shaft 63 in the axial direction is fixed to the rotation center of the worm wheel 62, the output shaft 63 being formed by a round steel bar (made of metal). Comparatively, the output gear 64 (see FIG. 2) engaged with the pair of driving cables 17a, 17b (see FIG. 1) is integrally provided at the tip end part of the output shaft 63 in the axial direction.

Therefore, the high-speed rotation of the shaft 44 is decelerated by the deceleration mechanism 60, and the rotation force that is decelerated and turned into a high torque is transmitted to the pair of driving cables 17a, 17b via the output shaft 63 and the output gear 64. By using the worm 61 and the worm wheel 62, the deceleration mechanism 60 is formed.

Here, in the worm wheel accommodation part 55, a side opposite to the side of the first wall part 52 is opened (not shown). In addition, as shown in FIG. 3, the opening portion of the worm wheel accommodation part 55 is blocked by a cover member 56 formed by performing a pressing process on a steel plate (made of metal). A total of four insertion legs 56a are integrally provided on the outer circumferential portion of the cover member 56. The insertion legs 56a extend toward the first wall part 52 and, as shown in FIG. 4, are inserted into insertion holes HL of the housing 51 in a retained state.

Moreover, as shown in FIG. 4, the worm accommodation part 57 is provided inside the housing 51. The worm accommodation part 57 is disposed near the second wall part 53. In addition, the worm accommodation part 57 is disposed near the worm wheel accommodation part 55. The insides of the worm accommodation part 57 and the worm wheel accommodation part 55 are in communication with each other in the vicinity of the engaged portion of the worm 61 and the tooth part 62a.

The worm accommodation part 57 extends in the axial direction of the shaft 44, and the second metal M2 rotatably supporting the tip end side of the shaft 44 in the axial direction is accommodated on the side (left side of FIG. 4) of the worm accommodation part 57 in the axial direction. The center of the second metal M2 is also aligned with the center AC (see FIG. 5) of the case 31.

In this way, the shaft 44 is supported at three points by the three bearings (the first metal M1, the second metal M2, and the ball bearing 70). Thus, at the time when the sunroof motor 20 operates, the separation of the worm 61 from the tooth part 62a of the worm wheel 62 is suppressed, and it is possible for the worm 61 and the tooth part 62a to be reliably engaged with each other.

In addition, the inner race 71 of the ball bearing 70 is fixed to the shaft 44, and the outer race 72 of the ball bearing 70 is supported by the bearing support member 39. Therefore, the shaft 44 does not move in the axial direction thereof. Thus, it is not required to provide thrust bearings on the two sides of the shaft 44 in the axial direction. Thus, the number of parts and the weight are reduced.

Meanwhile, in order to smoothly rotate the shaft 44 through the support at three points, it is required that the accuracy of the components forming the sunroof motor 20 and the accuracy of assembling the components be increased. Specifically, it is required to respectively dispose the first metal M1, the second metal M2, and the ball bearing 70 accurately at the center AC of the case 31. However, such measures are not realistic because these measures complicate the manufacturing process and increase the product cost.

Thus, in the embodiment, in the radial direction of the ball bearing 70, a support ring SR movable in the radial direction is provided between the outer race 72 and the housing 51. Here, the support ring SR is only allowed to move slightly in the radial direction inside the housing 51, so that the worm 61 and the tooth part 62a are not disengaged from each other or loosely engaged.

[Metal Jacket]

As shown in FIGS. 2 to 4, a metal jacket 80 is mounted to the outer side of the sunroof motor 20, specifically the outer side of the housing 51. The metal jacket 80 has a function of preventing the electrical noise generated inside the sunroof motor 20 from being radiated to the outside of the housing 51. Specifically, the metal jacket 80 has a function of receiving the electrical noise about to escape to the periphery of the housing 51 made of resin and releasing (grounding) the electrical noise to the vehicle body via the case 31 made of a steel material.

The metal jacket 80 includes a first conductive plate 81 and a second conductive plate 82. The first and second conductive plates 81, 82 are respectively formed in predetermined shapes by performing a pressing process, etc., on thin steel plates (magnetic bodies) formed of a material with excellent electrical conductivity. In addition, the first and second conductive plates 81, 82 are electrically connected to be able to be conductive to each other.

[Support Structure of Stator]

In the following, the support structure of the stator 35 (stator unit 34) with respect to the case 31 is described in detail with reference to the drawings.

As shown in FIG. 5, the sidewall part 32 forming the case 31 includes a total of six flat parts 32A to 32F. Specifically, in the clockwise direction, the first flat part 32A, the second flat part 32B, the third flat part 32C, the fourth flat part 32D, the fifth flat part 32E, and the sixth flat part 32F are disposed in order. That is, the total of six flat parts 32A to 32F are arranged in the circumferential direction of the case 31.

In addition, the first flat part 32A and the fourth flat part 32D face each other with the center AC of the case 31 as the center, the second flat part 32B and the fifth part 32E face each other with the center AC of the case 31 as the center, and the third flat part 32C and the fourth flat part 32D face each other with the center AC of the case 31 as the center. Accordingly, the sunroof motor 20 is flattened (thinned).

In addition, as shown in FIG. 5, the sidewall part 32 forming the case 31 includes a total of six arced parts 32a to 32f. The arced parts 32a to 32f have a function of connecting adjacent flat parts with each other in the circumferential direction of the case 31, and are equivalent to the connection parts of the invention. Specifically, in the clockwise direction, the first arced part 32a, the second arced part 32b, the third arced part 32c, the fourth arced part 32d, the fifth arced part 32e, and the sixth arced part 32f are disposed in order.

In addition, the first arced part 32a connects the first flat part 32A and the second flat part 32B (see the portion of (1) in FIG. 5). The second arced part 32b connects the second flat part 32B and the third flat part 32C (see the portion of (2) in FIG. 5). The third arced part 32c connects the third flat part 32C and the fourth flat part 32D (see the portion of (3) in FIG. 5). The fourth arced part 32d connects the fourth flat part 32D and the fifth flat part 32E (see the portion of (4) in FIG. 5). The fifth arced part 32e connects the fifth flat part 32E and the sixth flat part 32F (see the portion of (5) in FIG. 5). The sixth arced part 32f connects the sixth flat part 32F and the first flat part 32A (see the portion of (6) in FIG. 5).

In addition, on the radially inner sides of the first to sixth arced parts 32a to 32f, inner circumferential surfaces CF are respectively provided. The inner circumferential surfaces CF of the arced parts 32a to 32f, when viewed in the axial direction of the shaft 44, are each formed in an arced shape having a radius R1 and the center AC of the case 31 as the center. In addition, the length dimensions of the first to sixth arced parts 32a to 32f along the circumferential direction of the case 31 are each arranged to be a same length dimension L1 (see FIG. 6).

Comparatively, on the radially outer side of the stator 35 accommodated inside the case 31, a total of six flat surfaces FS1 to FS6 and a total of six arced surfaces AS1 to AS6 are provided. Specifically, in the clockwise direction, the first flat surface FS1, the second flat surface FS2, the third flat surface FS3, the fourth flat surface FS4, the fifth flat surface FS5, and the sixth flat surface FS6 are disposed in order.

In addition, the first arced surface AS1 is disposed between the first flat surface FS1 and the second flat surface FS2 (see the portion of (1) in FIG. 5). The second arced surface AS2 is disposed between the second flat surface FS2 and the third flat surface FS3 (see the portion of (2) in FIG. 5). The third arced surface AS3 is disposed between the third flat surface FS3 and the fourth flat surface FS4 (see the portion of (3) in FIG. 5). The fourth arced surface AS4 is disposed between the fourth flat surface FS4 and the fifth flat surface FS5 (see the portion of (4) in FIG. 5). The fifth arced surface AS5 is disposed between the fifth flat surface FS5 and the sixth flat surface FS6 (see the portion of (5) in FIG. 5). The sixth arced surface AS6 is disposed between the sixth flat surface FS6 and the first flat surface FS1 (see the portion of (6) in FIG. 5).

The first to sixth arced surfaces AS1 to AS6, when viewed in the axial direction of the shaft 44, are each formed in an arced shape (see FIG. 6) having the radius R1 and the center AC of the case 31 as the center. Thus, the first to sixth arced surfaces AS1 to AS6 are respectively supported by the inner circumferential surfaces CF of the first to sixth arced parts 32a to 32f through surface contact. That is, the stator 35 is only supported by the respective (six in total) inner circumferential surfaces CF. Here, the length dimensions of the first to sixth arced surfaces AS1 to AS6 along the circumferential direction of the stator 35 are each arranged as a same length dimension L2.

However, the length dimension L2 of the first to sixth arced surfaces AS1 to AS6 is smaller than the length dimension L1 of the first to sixth arced surfaces 32a to 32f (L2<L1). Accordingly, compared with the conventional art, the contact portion of the stator 35 with respect to the case 31 is reduced. Therefore, at the time of installing the stator unit 34 to the case 31 through insertion, it is possible to reduce the press-fit load at this time as compared to the conventional art. At this time, the first to sixth arced surfaces AS1 to AS6 are respectively brought into surface contact with the inner circumferential surfaces CF of the first to sixth arced parts 32a to 32f. Therefore, the first to sixth arced surfaces AS1 to AS6 do not scrape the inner circumferential surfaces CF.

In addition, by simply installing the stator unit 34 to the case 31, the centers AC of the stator unit 34 and the case 31 are automatically aligned. Therefore, the axial displacement between the stator unit 34 and the case 31 (the displacement of the centers AC from each other) as in the conventional art does not occur.

Here, as shown in FIG. 7, in the case 31, the bottom wall part 33 accommodating the first metal M1 rotatably supporting the end part of the shaft 44 is provided. When viewed in the axial direction of the shaft 44, the bottom wall part 33 is formed in a cylindrical shape with the center AC of the case 31 as the center. Therefore, it is also possible to accurately arrange the center of the rotor unit 40 at the center of the case 31. That is, in the embodiment, it is possible accurately align the centers of the case 31, the stator unit 34, and the rotor unit 40, respectively.

In addition, as shown in FIG. 5, in the radial direction of the shaft 44, gaps G1 to G6 are provided between the first to sixth flat parts 32A to 32F and the first to sixth flat surfaces FS1 to FS6 of the stator 35, respectively. Here, when viewed in the axial direction of the shaft 44, the total six gaps G1 to G6 are gaps with a small dimension W1 with respect to the radial direction of the shaft 44, respectively. Specifically, the small dimension W1 is a dimension smaller than the thickness of the case 31.

In addition, at the time of assembling the sunroof motor 20, an adhesive (not shown) formed by epoxy resin, etc., is filled into the gaps G1 to G6, respectively. Accordingly, the stator 35 (stator unit 34) is prevented from coming off from the case 31, the rattling therebetween in the circumferential direction is suppressed.

[Assembling Procedure]

In the following, the assembling procedure of the sunroof motor 20 formed as the above, specifically, the procedure of assembling the stator 35 (stator unit 34) to the case 31, is described in detail with reference to FIGS. 8 and 9.

As shown in FIG. 8, firstly, the stator unit 34 and a case assembly CA assembled in advance in a separate manufacturing process are prepared. Here, the case assembly CA is a component in which the first metal M1 (see FIGS. 4 and 7) is mounted to the bottom wall part 33 of the case 31.

Here, a transition wire LN connecting the coils 38 of the same phase is provided on a side (left side of FIG. 8) of the stator unit 34 in the longitudinal direction, and a flange part FL abutting against the housing 51 (see FIG. 4) of the deceleration mechanism part 50 is provided on a side (left side of FIG. 8) of the case 31 in the longitudinal direction.

In addition, as indicated by an arrow sign AR1 of FIG. 8, the stator unit 34 is arranged to face the case 31. At this time, the other side (right side in the figure) of the stator unit 34 in the longitudinal direction faces a side (left side in the figure) of the case 31 in the longitudinal direction. In addition, as shown in FIG. 5, the first to sixth arced surfaces AS1 to AS6 respectively match the inner circumferential surfaces CF of the first to sixth arced parts 32a to 32f.

Then, as shown in FIG. 9, the stator unit 34 is inserted into the case 31 by pressing a mounting jig (not shown) on a side of the stator unit 34 in the longitudinal direction, at portions where the stator 35 is exposed, that is, portions (shaded portions in FIG. 9) of the stator 35 not covered by the insulator 37. Specifically, by using the mounting jig, pressing points PP provided at the shaded portions of FIG. 9 are pressed evenly.

Accordingly, the stator unit 34 can be mounted to the case 31 by using a pressing load that is relatively small (smaller than the conventional art), and the center of the stator unit 34 can be aligned with the center AC of the case 31. Even if the stator unit 34 is slightly deviated in the circumferential direction to rotate relatively with respect to the case 31, the centers of the stator unit 34 and the case 31 are not displaced from each other. Thus, it is possible to easily assemble the stator unit 34 to the case 31.

Here, as shown in FIG. 5, in the embodiment, the stator 35 is only supported by the total of six inner circumferential surfaces CF, and, when viewed in the axial direction of the shaft 44, the center AC of the case 31 is arranged in a region VP1 (region surrounded by a thick two-dot chain line) surrounded by a line connecting a total of six supported points (supported parts) SP of the stator 35 supported by the inner circumferential surfaces CF. Here, the supported points SP of the stator 35 are points of central parts in the circumferential direction in the first to six arced surfaces AS1 to AS6 forming the stator 35.

Accordingly, it is possible to press-fit the stator unit 34 with the case 31 in a balanced and accurate manner, and it is possible to align the center of the stator 35 (stator unit 34) with the center AC of the case 31.

As described above, according to the embodiment, the case 31 has the total of six flat parts, which are the first to sixth flat parts 32A to 32F, arranged in the circumferential direction of the case 31 and the total of six arced parts, which are the first to sixth arced parts 32a to 32f, connecting the adjacent flat parts. When viewed in the axial direction of the shaft 44, the inner circumferential surfaces CF of the first to sixth arced parts 32a to 32f are each formed in an arced shape having the radius R1 and the center AC of the case 31 as the center. In addition, since the stator 35 is only supported by the inner circumferential surfaces CF (six in total), the press-fit load of the stator 35 with respect to the case 31 can be reduced, and it is possible to increase the assembling accuracy.

In addition, according to the embodiment, in the radial direction of the shaft 44, the gaps G1 to G6 are provided between the first to sixth flat parts 32A to 32F and the first to sixth flat surfaces FS1 to FS6 of the stator 35, respectively. Accordingly, the respective gaps G1 to G6 can be filled with an adhesive agent formed by epoxy resin, etc. Thus, the stator 35 (stator unit 34) can be reliably prevented from coming off from the case 31, and the rattling therebetween in the circumferential direction can be reliably suppressed.

In addition, according to the embodiment, the case 31 includes the bottom wall part 33 accommodating the first metal M1 rotatably supporting the end part of the shaft 44. When viewed in the axial direction of the shaft 44, the bottom wall part 33 is formed in a cylindrical shape with the center AC of the case as the center. Accordingly, the center of the rotor unit 40 can also be accurately arranged at the center AC of the case 31. Thus, the centers of the case 31, the stator unit 34, and the rotor unit 40 can be accurately aligned, and thus the variation in rotation resistance among the electric motor parts 30 of the respective products can be suppressed.

In addition, according to the embodiment, the stator 35 is supported by the respective inner circumferential surfaces CF of the first to sixth arced parts 32a to 32f, and, when viewed in the axial direction of the shaft 44, the center AC of the case 31 is arranged in the region VP1 surrounded by the line connecting the total of six supported points SP of the stator 35 supported by the inner circumferential surfaces CF. Accordingly, the stator unit 34 can be press-fit with the case 31 in a balanced and accurate manner, and it is possible to reliably align the center of the stator 35 with the center AC of the case 31.

Moreover, according to the embodiment, the press-fit load of the stator 35 described above with respect to the case 31 is reduced, and the energy for manufacturing the electric motor part 30 can be reduced. Also, the variation in rotation resistance among the electric motor parts 30 of the respective products can be suppressed to suppress the occurrence of defective products. Accordingly, it is possible to realize the Sustainable Development Goals (SDGs) set by the United Nations, especially Goal 7 (ensure access to affordable, reliable, sustainable and modern energy for all) and Goal 13 (take urgent action to combat climate change and its impacts).

Embodiment 2

Next, Embodiment 2 of the invention is described in detail with reference to the drawings. It should be noted that portions having functions similar to those of First embodiment described above are denoted by the same symbols, and detailed description thereof will be omitted.

Figure 10:
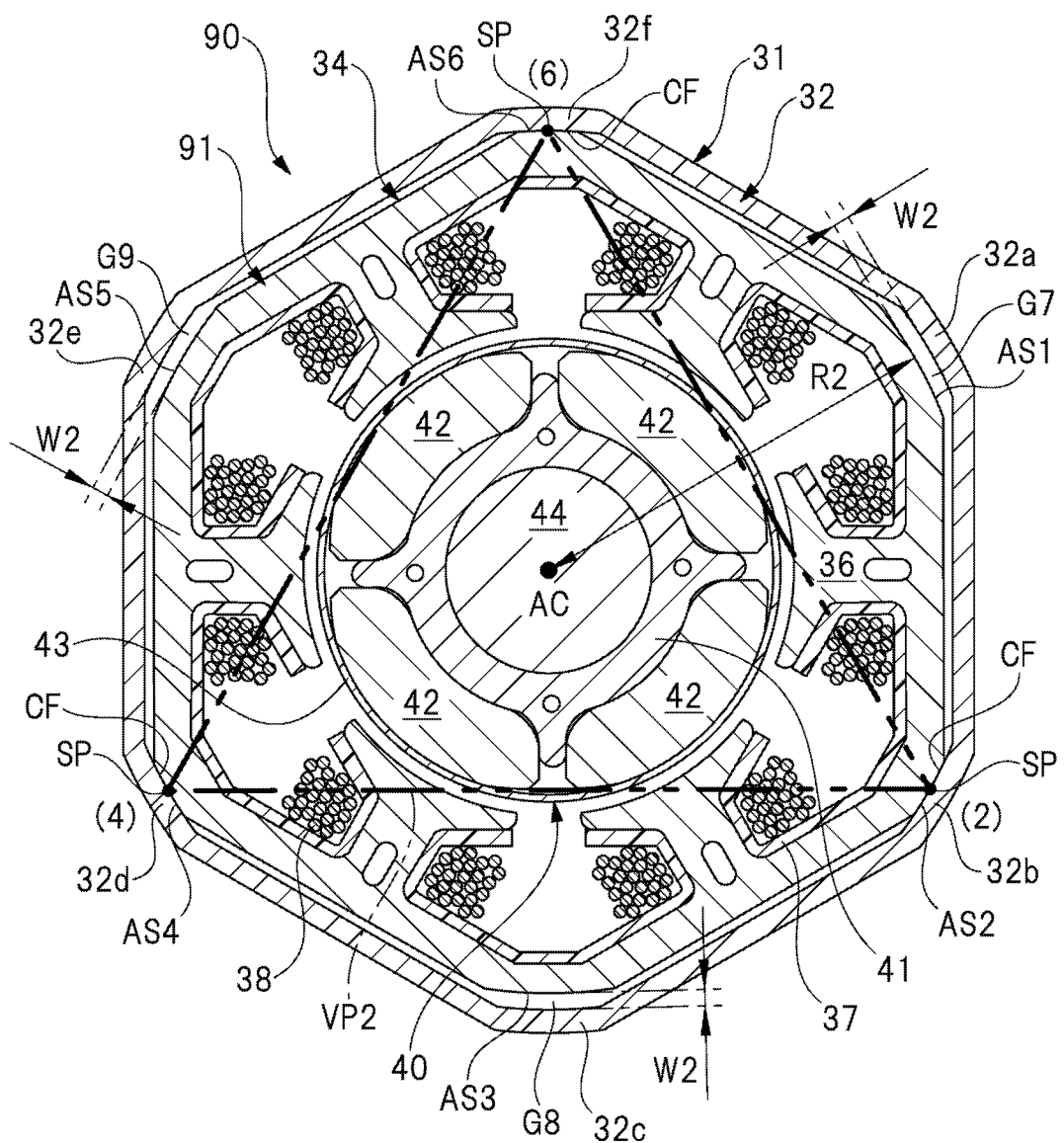
FIG. 10 is a cross-sectional view illustrating Embodiment 2 and corresponding to FIG. 6.

FIG. 10 is a cross-sectional view illustrating Embodiment 2 and corresponding to FIG. 6.

As shown in FIG. 10, in an electric motor part (brushless motor) 90 according to Embodiment 2, a stator 91 is supported only by a total of three inner circumferential surfaces CF, which are the inner circumferential surface CF of the second arced part 32b, the inner circumferential surface CF of the fourth arced part 32d, and the inner circumferential surface CF of the sixth arced part 32f forming the case 31. Specifically, in the circumferential direction of the case 31, the second arced part 32b, the fourth arced part 32d, and the sixth arced part 32f are arranged at an interval of 120°. The second arced surface AS2, the fourth aced surface AS4, and the sixth arced surface AS6 of the stator 91 are brought into surface contact with the inner circumferential surfaces CF of the second arced part 32b, the fourth arced part 32d, and the sixth arced part 32f, respectively.

Accordingly, when viewed in the axial direction of the shaft 44, the center AC of the case 31 is arranged in a region VP2 (region surrounded by a thick two-dot chain line) surrounded by a line connecting a total of three supported points SP of the stator 91 supported by the total of three inner circumferential surfaces CF.

Here, between the first arced surface AS1 of the stator 91 and the first arced part 32a of the case 31, between the third arced surface AS3 of the stator 91 and the third arced part 32c of the case 31, and between the fifth arced surface AS5 of the stator 91 and the fifth arced part 32e of the case 31, gaps G7 to G9 with a small dimension W2 (W2>W1) are formed.

In addition, when viewed in the axial direction of the shaft 44, the first arced surface AS1, the third arced surface AS3, and the fifth arced surface AS5 of the stator 91 are each formed in an arced shape having a radius R2 (R2<R1) and the center AC of the case 31 as the center.

In addition, at the time of assembling the sunroof motor 20 (electric motor part 90), an adhesive (not shown) formed by epoxy resin, etc., is also filled into the gaps G7 to G9 thereof.

In Embodiment 2 formed as the above as well, the same effects as those of Embodiment 1 can be achieved. In addition, since the supported points of the stator 35 are arranged at three places to be dispersed at an interval of 120°, it is possible to further reduce the press-fit load as compared to Embodiment 1, while ensuring the position accuracy of the stator 91 with respect to the case 31. Therefore, the assembling property of the electric motor part 90 can be further facilitated.

Embodiment 3

Next, Embodiment 3 of the invention is described in detail with reference to the drawings. It should be noted that portions having functions similar to those of First embodiment described above are denoted by the same symbols, and detailed description thereof will be omitted.

Figure 11:
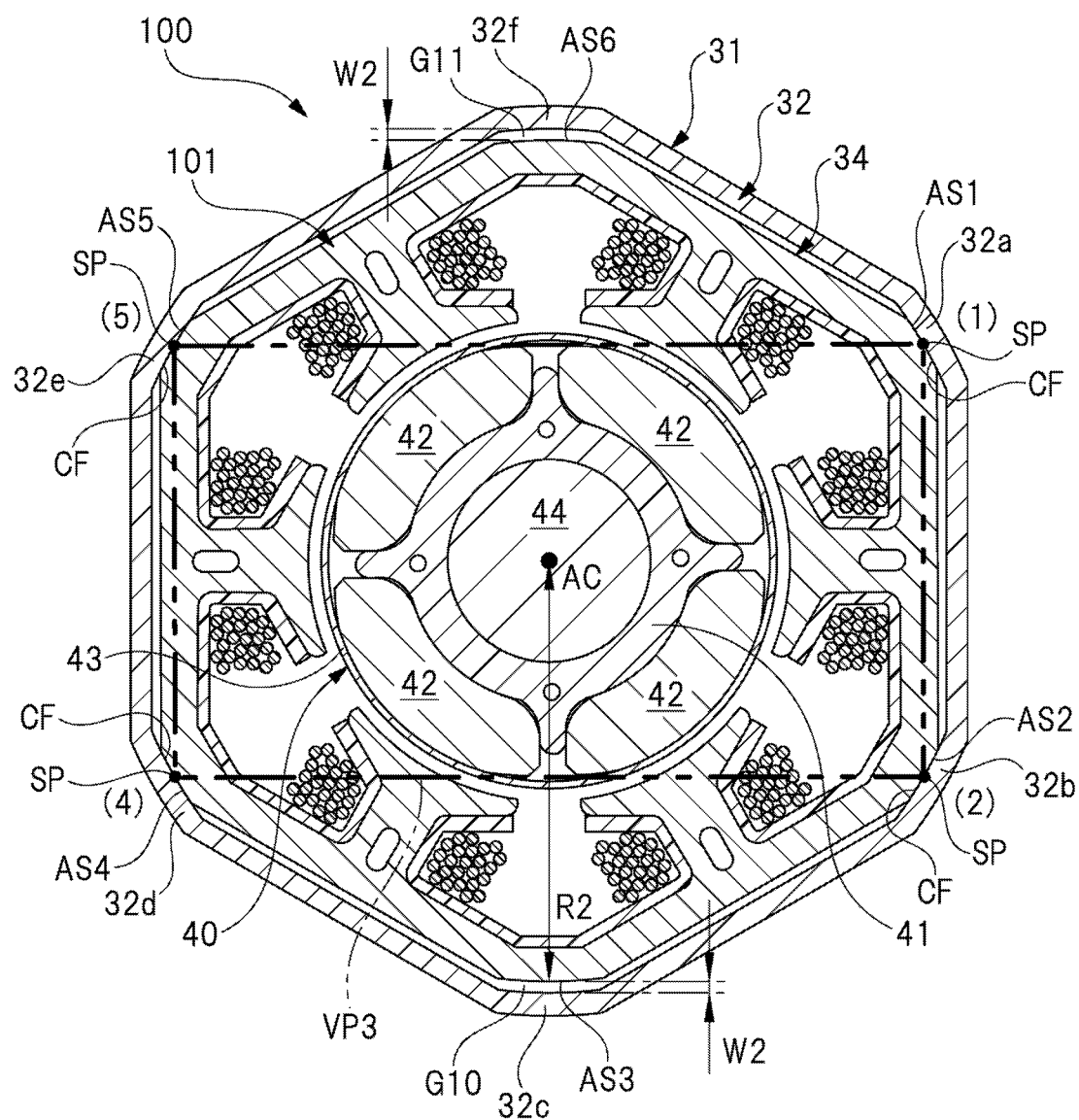
FIG. 11 is a cross-sectional view illustrating Embodiment 3 and corresponding to FIG. 6.

FIG. 11 is a cross-sectional view illustrating Embodiment 3 and corresponding to FIG. 6.

As shown in FIG. 11, in an electric motor part (brushless motor) 100 according to Embodiment 3, a stator 101 is supported only by a total of four inner circumferential surfaces CF, which are the inner circumferential surface CF of the first arced part 32a, the inner circumferential surface CF of the second arced part 32b, the inner circumferential surface CF of the fourth arced part 32d, and the inner circumferential surface CF of the fifth arced part 32e forming the case 31. Specifically, in the circumferential direction of the case 31, the first arced part 32a, the second arced part 32b, the fourth arced part 32d, and the fifth arced part 32e are arranged in order. The first arced surface AS1, the second arced surface AS2, the fourth aced surface AS4, and the fifth arced surface AS5 of the stator 101 are brought into surface contact with the inner circumferential surfaces CF of the first arced part 32a, the second arced part 32b, the fourth arced part 32d, and the fifth arced part 32e, respectively. In other words, in the arced parts (the first arced part 32a and the fourth arced part 32d, the second arced part 32b and the fifth arced part 32e) present at positions in point symmetry with reference to the center AC of the case 31 as the center, the inner circumferential surfaces CF of these arced parts are respectively brought into surface contact with the stator 101.

Accordingly, when viewed in the axial direction of the shaft 44, the center AC of the case 31 is arranged in a region VP3 (region surrounded by a thick two-dot chain line) surrounded by a line connecting a total of four supported points SP of the stator 101 supported by the total of four inner circumferential surfaces CF.

Here, between the third arced surface AS3 of the stator 101 and the third arced part 32c of the case 31 and between the sixth arced surface AS6 of the stator 101 and the sixth arced part 32f of the case 31, gaps G10, G11 with the small dimension W2 (W2>W1) are formed.

In addition, when viewed in the axial direction of the shaft 44, the third arced surface AS3 and the sixth arced surface AS6 of the stator 101 are each formed in an arced shape having the radius R2 (R2<R1) and the center AC of the case 31 as the center.

In addition, at the time of assembling the sunroof motor 20 (electric motor part 100), an adhesive (not shown) formed by epoxy resin, etc., is also filled into the gaps G10, G11 thereof.

In Embodiment 3 formed as the above as well, the same effects as those of Embodiment 2 can be achieved.

[Undesirable Stator Support Structure]

Here, undesirable stator support structures (Comparative Example 1 and Comparative Example 2) are described in detail with reference to the drawings. It should be noted that portions having functions similar to those of Embodiment 1 described above are denoted by the same reference symbols, and detailed description thereof will be omitted.

Figure 12:
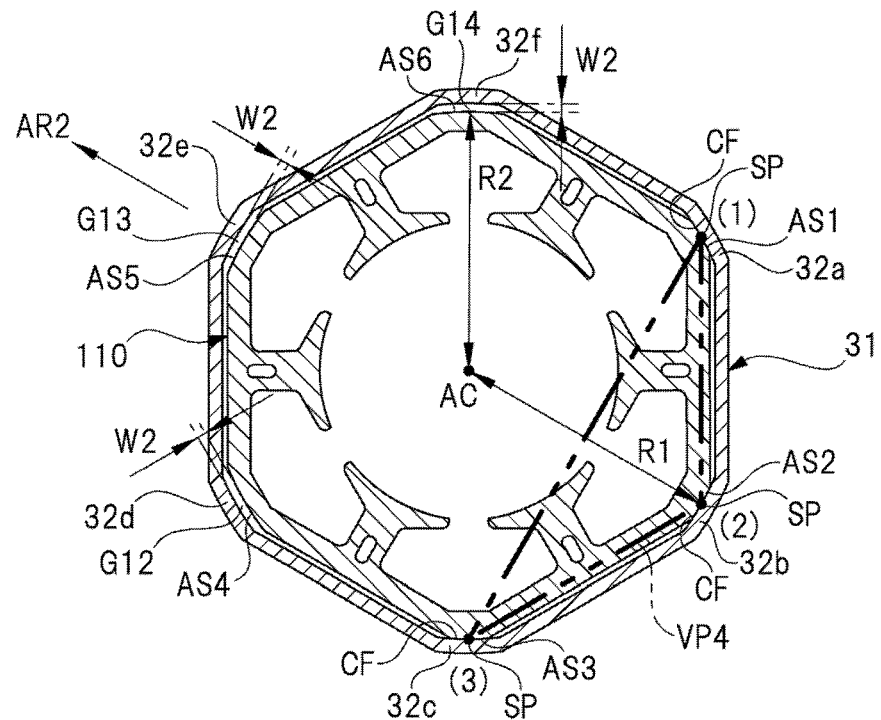
FIG. 12 is a view illustrating support locations of a stator of Comparative Example 1.
Figure 13:
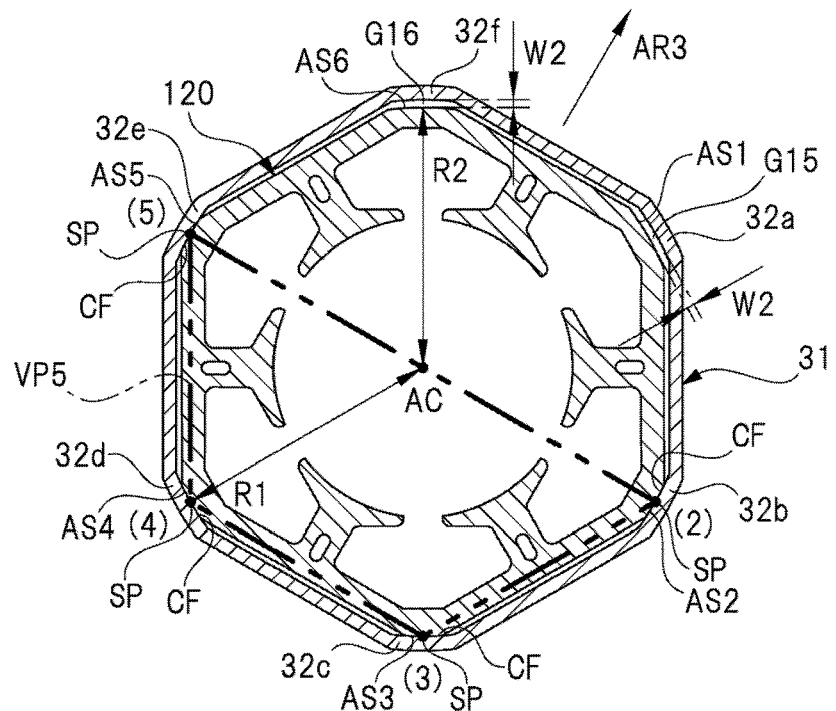
FIG. 13 is a view illustrating support locations of a stator of Comparative Example 2.

FIG. 12 is a view illustrating support locations of a stator of Comparative Example 1. FIG. 13 is a view illustrating support locations of a stator of Comparative Example 2.

Comparative Example 1

In Comparative Example 1 shown in FIG. 12, it is designed that the first arced surface AS1, the second arced surface AS2, and the third arced surface AS3 having the radius R1 and the center AC of the case 31 as the center are provided in the stator 110, and the first arced surface AS1, the second arced surface AS2, and the third arced surface AS3 are brought into surface contact with the inner circumferential surface CF of the first arced part 32a, the inner circumferential surface CF of the second arced part 32b, and the inner circumferential surface CF of the third arced part 32c of the case 31, respectively.

In addition, the fourth arced surface AS4, the fifth arced surface AS5, and the sixth arced surface AS6 having the radius R2 (R2<R1) and the center AC of the case 31 as the center are also provided in the stator 110. That is, as shown in FIG. 12, in the case where the center AC of the case 31 is aligned with the center of the stator 110, gaps G12, G13, G14 having the small dimension W2 (W2>W1) are formed between the fourth arced surface AS4 and the fourth arced part 32d, the fifth arced surface AS5 and the fifth arced part 32e, and the sixth arced surface AS6 and the sixth arced part 32f, respectively.

In such Comparative Example 1, when viewed in the axial direction of the shaft 44 (see FIG. 5), the center AC of the case 31 is arranged outside a region VP4 (region surrounded by a thick two-dot chain line) surrounded by a line connecting the total of three supported points SP of the stator 110 supported by the total of three inner circumferential surfaces CF. Therefore, there is a concern that the stator 110 may move with respect to the case 31 in a direction indicated by an arrow sign AR2 in FIG. 12, and the center of the stator 110 may be easily displaced from the center of the case 31. Thus, a design like Comparative Example 1 (FIG. 12) is not desired.

Comparative Example 2

In Comparative Example 2 shown in FIG. 13, it is designed that the second arced surface AS2, the third arced surface AS3, the fourth arced surface AS4, and the fifth arced surface AS5 having the radius R1 and the center AC of the case 31 as the center are provided in a stator 120, and the second arced surface AS2, the third arced surface AS3, the fourth arced surface AS4, and the fifth arced surface AS5 are brought into surface contact with the inner circumferential surface CF of the second arced part 32b, the inner circumferential surface CF of the third arced part 32c, the inner circumferential surface CF of the fourth arced part 32d, and the inner circumferential surface CF of the fifth arced part 32e of the case 31, respectively.

In addition, the first arced surface AS1 and the sixth arced surface AS6 having the radius R2 (R2<R1) and the center AC of the case 31 as the center are also provided in the stator 120. That is, as shown in FIG. 13, in the case where the center AC of the case 31 is aligned with the center of the stator 120, gaps G15, G16 having the small dimension W2 (W2>W1) are formed between the first arced surface AS1 and the first arced part 32a and the sixth arced surface AS6 and the sixth arced part 32f, respectively.

In such Comparative Example 2, when viewed in the axial direction of the shaft 44 (see FIG. 5), the center AC of the case 31 is arranged on the line of a region VP5 (region surrounded by a thick two-dot chain line) surrounded by the line connecting the total of four supported points SP of the stator 120 supported by the total of four inner circumferential surfaces CF. Therefore, there is a concern that the stator 120 may move with respect to the case 31 in a direction indicated by an arrow sign AR3 in FIG. 13, and the center of the stator 120 may be easily displaced from the center of the case 31. Thus, a design like Comparative Example 2 (FIG. 13) is not desired.

It goes without saying that the invention is not limited to the above-described embodiments, and various modifications can be made without departing from the gist of the invention. In the above embodiments, the invention is applied to the sunroof motor 20 used in the sunroof device 10 of the vehicle 12. However, the invention is not limited thereto. For example, the invention is also applicable to vehicle-mounted motors for a slide door device, a power window device, a wiper device, etc.

In addition, the material, shape, size, number, installation location, etc. of each component in the above embodiments are arbitrary as long as the present invention can be achieved, and are not limited to the above embodiments.

What is claimed is:

1. A brushless motor, comprising:
a stator, having a hollow part;
a case, accommodating the stator; and
a shaft, rotatably accommodated in the hollow part, and rotatably supported by the case,
wherein:
the case has a plurality of flat parts arranged in a circumferential direction of the case and a plurality of connection parts connecting adjacent flat parts of the flat parts with each other,
when viewed in an axial direction of the shaft, inner circumferential surfaces of the connection parts are formed to be arc-shaped, with a center of the case as a center, and
the stator is supported only by the inner circumferential surfaces,
wherein, in a radial direction of the shaft, gaps are provided between the flat parts and the stator.

2. The brushless motor as claimed in claim 1, comprising a bearing accommodation part, accommodating a bearing rotatably supporting an end part of the shaft, and
when viewed in the axial direction of the shaft, the bearing accommodation part is formed in a cylindrical shape with the center of the case as a center.

3. The brushless motor as claimed in claim 1, wherein the stator is supported by at least three of the inner circumferential surfaces, and, when viewed in the axial direction of the shaft, the center of the case is arranged in a region surrounded by a line connecting at least three supported parts of the stator supported by the inner circumferential surfaces.

* * * * *